United States Patent
Scales

(10) Patent No.: US 8,185,954 B2
(45) Date of Patent: May 22, 2012

(54) RESISTING THE SPREAD OF UNWANTED CODE AND DATA

(75) Inventor: Nicholas John Scales, Essex (GB)

(73) Assignee: Glasswall (IP) Limited, London (GB)

( * ) Notice: Subject to any disclaimer, the term of this patent is extended or adjusted under 35 U.S.C. 154(b) by 960 days.

(21) Appl. No.: 11/915,125

(22) PCT Filed: Jun. 9, 2006
(Under 37 CFR 1.47)

(86) PCT No.: PCT/GB2006/002107
§ 371 (c)(1),
(2), (4) Date: Jun. 17, 2008

(87) PCT Pub. No.: WO2006/131744
PCT Pub. Date: Dec. 14, 2006

(65) Prior Publication Data
US 2009/0138972 A1 May 28, 2009

(30) Foreign Application Priority Data
Jun. 9, 2005 (GB) .................................. 0511749.4

(51) Int. Cl.
*G06F 12/14* (2006.01)
*H04L 29/06* (2006.01)
*G06F 11/30* (2006.01)

(52) U.S. Cl. ........... 726/22; 726/1; 726/3; 726/4; 726/6; 726/14; 726/24; 726/26; 726/28; 726/30; 713/154; 713/165; 713/167; 713/187; 713/188; 713/193

(58) Field of Classification Search .................... 726/22, 726/1; 713/154, 165, 188
See application file for complete search history.

(56) References Cited

U.S. PATENT DOCUMENTS

| | | | |
|---|---|---|---|
| 5,050,212 A | | 9/1991 | Dyson |
| 5,649,095 A | * | 7/1997 | Cozza .............................. 714/39 |
| 5,745,897 A | * | 4/1998 | Perkins et al. ......................... 1/1 |
| 5,832,208 A | * | 11/1998 | Chen et al. ....................... 726/24 |
| 6,144,934 A | | 11/2000 | Stockwell et al. |
| 6,336,124 B1 | | 1/2002 | Alam et al. |
| 6,401,210 B1 | * | 6/2002 | Templeton ...................... 726/24 |
| 6,493,761 B1 | * | 12/2002 | Baker et al. ..................... 709/230 |
| 6,697,950 B1 | * | 2/2004 | Ko .................................. 726/24 |

(Continued)

FOREIGN PATENT DOCUMENTS

DE 10235819 A1 2/2004

(Continued)

OTHER PUBLICATIONS

Oct. 21, 2005 search report in connection with a counterpart British patent application.

(Continued)

*Primary Examiner* — Edan Orgad
*Assistant Examiner* — Jenise Jackson
(74) *Attorney, Agent, or Firm* — Cooper & Dunham LLP

(57) ABSTRACT

A method or system of receiving an electronic file containing content data in a predetermined data format, the method comprising the steps of: receiving the electronic file, determining the data format, parsing the content data, to determine whether it conforms to the predetermined data format, and if the content data does conform to the predetermined data format, regenerating the parsed data to create a regenerated electronic file in the data format.

21 Claims, 5 Drawing Sheets

U.S. PATENT DOCUMENTS

| | | | |
|---|---|---|---|
| 6,922,827 B2* | 7/2005 | Vasilik et al. | 717/140 |
| 7,093,135 B1* | 8/2006 | Radatti et al. | 713/188 |
| 7,240,279 B1* | 7/2007 | Chartier et al. | 715/210 |
| 7,269,733 B1* | 9/2007 | O'Toole, Jr. | 713/175 |
| 7,496,963 B2* | 2/2009 | Shipp | 726/24 |
| 7,607,172 B2 | 10/2009 | Zurko et al. | |
| 7,636,856 B2 | 12/2009 | Gheorghescu et al. | |
| 7,664,754 B2 | 2/2010 | Shipp | |
| 7,685,174 B2 | 3/2010 | Koestler | |
| 7,756,834 B2 | 7/2010 | Masters et al. | |
| 2002/0004908 A1 | 1/2002 | Galea | |
| 2002/0072926 A1* | 6/2002 | Morita et al. | 705/1 |
| 2002/0073330 A1 | 6/2002 | Chandnani et al. | |
| 2002/0174185 A1 | 11/2002 | Rawat et al. | |
| 2002/0178396 A1* | 11/2002 | Wong et al. | 714/4 |
| 2002/0184555 A1* | 12/2002 | Wong et al. | 714/4 |
| 2003/0079142 A1 | 4/2003 | Margalit et al. | |
| 2003/0079158 A1 | 4/2003 | Tower et al. | |
| 2003/0145213 A1* | 7/2003 | Carbone | 713/188 |
| 2003/0163732 A1* | 8/2003 | Parry | 713/201 |
| 2003/0163799 A1* | 8/2003 | Vasilik et al. | 717/100 |
| 2003/0196104 A1 | 10/2003 | Baber et al. | |
| 2003/0229810 A1 | 12/2003 | Bango | |
| 2004/0008368 A1* | 1/2004 | Plunkett et al. | 358/1.15 |
| 2004/0181543 A1* | 9/2004 | Wu et al. | 707/102 |
| 2004/0199594 A1 | 10/2004 | Radatti et al. | |
| 2004/0230903 A1* | 11/2004 | Elza et al. | 715/513 |
| 2005/0071477 A1* | 3/2005 | Evans et al. | 709/228 |
| 2005/0081057 A1 | 4/2005 | Cohen et al. | |
| 2005/0132206 A1* | 6/2005 | Palliyil et al. | 713/188 |
| 2005/0132227 A1* | 6/2005 | Reasor et al. | 713/201 |
| 2005/0149720 A1 | 7/2005 | Gruper et al. | |
| 2005/0193070 A1* | 9/2005 | Brown et al. | 709/206 |
| 2005/0278318 A1* | 12/2005 | Vasilik et al. | 707/3 |
| 2006/0037079 A1* | 2/2006 | Midgley | 726/24 |
| 2006/0195451 A1 | 8/2006 | Smith et al. | |
| 2006/0230451 A1* | 10/2006 | Kramer et al. | 726/22 |
| 2007/0083929 A1* | 4/2007 | Sprosts et al. | 726/22 |
| 2007/0277238 A1 | 11/2007 | Margalit et al. | |
| 2009/0178144 A1* | 7/2009 | Redlich et al. | 726/27 |
| 2009/0210936 A1* | 8/2009 | Omar et al. | 726/14 |
| 2009/0254992 A1* | 10/2009 | Schultz et al. | 726/24 |
| 2009/0296657 A1* | 12/2009 | Omar et al. | 370/331 |
| 2010/0054278 A1* | 3/2010 | Stolfo et al. | 370/474 |
| 2010/0153507 A1* | 6/2010 | Wei et al. | 709/206 |
| 2011/0213783 A1* | 9/2011 | Keith, Jr. | 707/741 |

FOREIGN PATENT DOCUMENTS

| | | |
|---|---|---|
| EP | 1122932 A2 | 8/2001 |
| EP | 1560112 A1 | 8/2005 |
| GB | 2357939 A | 7/2001 |
| JP | 2002-259187 | 9/2002 |
| WO | WO01/26004 A2 | 4/2001 |

OTHER PUBLICATIONS

Apr. 13, 2006 search report in connection with a counterpart European patent application.

Oct. 4, 2006 International Search Report in connection with PCT/GB2006/002107.

Salamone, Salvatore (1992), "A Magic Bullet for Netware Viruses. Untouchable Network NLM can detect and eliminate known and unknown viruses from Netware servers," Data Communications, vol. 21, pp. 45-46.

Saito, Tadao, et al. (1993), "Protection Against Trojan Horses by Source Code Analaysis," Electronics and Communications in Japan—Fundamental Electronic Science , Part 3, vol. 77, No. 1, pp. 11-18.

"MailStreet Features and Benefits," Apr. 22, 2004, retrieved from the Internet: http://web.archive.org/web/2004042104456/http://www.mailstreet.com/defender/features.asp.

"Checking of incoming files for macro viruses," Online 2004, retrieved from the Internet: http://www.bsi.de/english/gshb/manuals/s04044.html.

"MailStreet Features and Benefits," Apr. 21, 2004, XP002356823,retrieved from the Internet: URL: http://web.archive.org.web/20040421044456/http://www.mailstreet.com/defender/features.asp.

"Checking of incoming files for macro viruses," Onlinie 2004, XP002376936, retrieved from the Internet: URL: http://www.bsi.de/english/gshb/manual/s/s04044.html.

Sep. 7, 2011 Japanese official action in connection with counterpart Japanese patent application No. 2008-515291.

* cited by examiner

| | |
|---|---|
| RFC822 HEADER | 401 |
| MIME HEADER | 403 |
| BOUNDARY | 405 |
| MIME HEADER | 407 |
| TEXT | 409 |
| BOUNDARY | 411 |
| MIME HEADER | 413 |
| TEXT/HTML | 415 |
| BOUNDARY | 417 |
| MIME HEADER | 419 |
| ZIP FILE (Base 64 encoded) | 421 |
| BOUNDARY | 423 |

FIG. 4

RESISTING THE SPREAD OF UNWANTED CODE AND DATA

RELATED APPLICATION DATA

This application claims priority and benefit of PCT/GB2006/002107 filed Jun. 9, 2006, which claims priority from Great Britain Application Serial No. 0511749.4, filed Jun. 9, 2005, the entire contents of which are herein incorporated by reference.

This invention relates to computer systems and methods of operating such systems for resisting the spread of unwanted code and data.

In the past decade, computer systems have increasingly come wider attack by unwanted code. The most extreme examples (so far) of unwanted code are computer viruses. A computer virus, like its biological namesake, is capable of infecting one machine and then, from there, infecting others, by commandeering the resources of the email system to send emails containing the virus from one computer to many others, utilising the address book of each computer on which it lands.

The resultant wasted bandwidth is an annoyance to users. Further, many viruses perform some unwanted action on each computer on which they land, which may include erasing files for example.

Viruses typically arrive as executable code, in a separate attachment file, but they may also be hidden in parts of an email, so that they may become active without requiring a user to explicitly detach and execute code. Many applications, such as word processors, spreadsheets and databases, include powerful macro scripting languages, which allow a file that appears to be a document to include a script capable of performing certain operations. Virus writers have made use of such scripting languages to write macro viruses, so that email attachments that include files appearing to be documents may harbour a concealed virus.

Viruses are not the only form of unwanted code. It is common for "free" programs to be distributed with concealed "Spyware" which may, for example, be covertly installed on a user's computer and may subsequently report websites visited or other transactions to a remote computer. Some Spyware will cause the display of unwanted advertising. Some Spyware will attempt to cause a modem to repeatedly dial a high rate number, on which the Spyware writer receives income from a telecoms operator. Other types of harmful code include Malware, Worms, and Trapdoors.

Whilst viruses are self-propagating from one computer to another, other forms of unwanted code are distributed by spam email, by concealed distribution on disc, or, increasingly, by download from an inadvertently visited website. All such types of unwanted code have in common the fact that their existence or their real purpose is concealed from the owners and users of the computers at which they are targeted. Whilst some types are relatively harmless, others have the capacity to wipe out valuable business data and an industry for supplying anti-virus software has therefore developed.

Anti-virus software as it is presently known consists of a program which is executed on the computer to be protected. Such programs typically operate in a monitor mode, in which files to be accessed are checked for viruses at each time of access to the file, and in a scanning mode in which all files in a particular location (such as a disc drive) are scanned. Anti-virus program providers monitor virus outbreaks and, when a new virus is detected, the anti-virus program companies analyse the virus and extract data which can be used to detect the virus. This data is then made available to the computers which run the particular anti-virus program concerned; typically, by providing it on the website of the anti-virus program company for downloading.

Viruses are detected in various different ways. A string of characteristic code forming part of the virus may be stored and incoming files scanned for the presence of that string, which therefore acts as a "signature" or "fingerprint" for the virus. Alternatively, viruses may be detected by their intended behaviour; source code or script files may be parsed to detect predetermined operations which are characteristic of a virus.

Unfortunately, viruses, like their biological counterparts, can easily be "mutated"; minor changes in code, equivalent to the substitution of uppercase and lowercase letters, can change the signature of the virus. The files of data for detecting viruses, by whatever method, are therefore becoming extremely large, and the time taken by antivirus programs is correspondingly increasing as the number of signatures or rules to be checked is growing. Whilst this may be acceptable in virus scanning mode, it is adding an ever-increasing latency to the time taken to access files in monitoring mode. Further, as downloads become larger and are required more frequently, the risk that a user will fail to download necessary updates, and will therefore be unprotected against the most recent (and therefore the most dangerous) virus, is high.

The present invention therefore takes an entirely different approach to protection against unwanted code. According to one aspect of the present invention, there is provided a method of receiving an electronic file containing content data in a predetermined data format, the method comprising the steps of: receiving the electronic file, determining the data format, parsing the content data, to determine whether it conforms to the predetermined data format, and if the content data does conform to the predetermined data format, regenerating the parsed data to create a regenerated electronic file in the data format.

Corresponding computer systems, programs, and media carrying such programs are also provided.

An embodiment of the invention operates to analyse each received file and then reconstitute from it a substitute file. Because the original file is not itself directly stored, or accessed, on the computer to be protected, it is not, itself capable of harming that computer. It may, for example, be stored in a bit-reversed form or other form in which it cannot be executed. On the other hand, the substitute file will be generated using a generator routine which can generate only "clean" code and data. It is therefore incapable of generating unwanted code matching any code in a received file.

Part of the present invention can be based on a new application of some long-known truths about computer files. The vast majority of files that are imported onto a computer nowadays are in standardised file formats. Proprietary programs create their own file formats (and data intended to be used by those programs must conform to those formats) but there is sufficient demand for exchange of data between different proprietary programs that, firstly, one proprietary program is often supplied with import filters to read data written by another, and, secondly, several formats exist which are not associated with any proprietary program. Examples of such generic formats are ASCII text, rich text format (RTF), hypertext markup language (HTML) and extendible markup language (XML).

Data in files must therefore conform precisely to rigid standards if it is to be read by any application program, and the formats used by different files are widely known. The present inventors have realised that, although the formats used by files permit wide variation, the vast majority of files contain data meeting, some relatively narrow pragmatic constraints. For example, most operating systems and applications will accept file titles of great length, but most users, most of the time, use short and easily recognisable file names.

Accordingly, the analysis performed by an embodiment of the present invention can comprise detecting whether data which otherwise conforms to the specification for the purported file type violates pragmatic limits. These 'real world' constraints enable the present invention to detect 'normal' acceptable files. Any file content which does not correspond to pragmatic limits of this type is not passed to the generator program and therefore does not reach the users computer in an executable form.

It will therefore be seen that an embodiment of the present invention operates in a fundamentally different manner to anti-virus programs. Known anti-virus programs aim to detect viruses, and pass everything which is not detected to be a virus. They therefore always fail to protect the user from the greatest danger; namely, that of unknown viruses. Each new virus that is launched must already have infected a number of computers before it comes to the attention of the anti-virus companies.

Further, even where anti-virus software is installed, and possesses an up-to-date set of detected data, viruses will usually be stored on the hard drive or other media of the protected computer before they can be detected by the anti-virus software. If, for some reason, the anti-virus software fails to run, the virus is in place and can be activated.

US published application US 2003/0145213 discloses a system wherein a macro or malicious code is detected in a file. The file is then reconstructed in a template and the malicious code is removed from the template to provide a clean version of the file.

By way of complete contrast, the present invention need not aim to detect viruses, or even to reject typically virus-like behaviour. Instead, it can reject all incoming files altogether, and substitute in their place, where possible, generated files which cannot contain unwanted code and data. Unwanted code and data can therefore be prevented from ever reaching the hard drive of the computer to be protected in executable form, and cannot be propagated from one computer to another.

At this point, it may be mentioned that US published application 2003/229810 discloses a proposal for an "optical firewall" for protection against viruses. For reasons that will shortly become evident, it is not thought that this system has been put into effect (or that it could be put into effect). It describes a system in which a firewall computer receives a file such as an image file, and displays the image on the display of the firewall computer. An optical sensor array scans the image and the scanned image is then supplied to the intended recipient. Any viruses that were hidden in the image are not displayed, and consequently, are not passed on in the scanned image. In a variant, a bitmap of the screen may be used instead of an actual screen display.

For various reasons, the "optical coupler" firewall provided in the above mentioned US patent application could not provide an effective and reliable protection against viruses.

For example, reproduction using optical character recognition (OCR) software can provide inaccurate information. Further, reproduction of images using the video technique can provide lower quality images than intended. Also, the computer receiving the incoming file will become infected if the incoming file contains a virus.

On the other hand, by analysing and then re-generating files instead of executing them, displaying them, and optically scanning them, an embodiment of the present invention is capable of providing substitute files which in the vast majority of cases closely emulate the original file (if it is free of unwanted code) so as to make the substitution transparent.

File formats vary in their complexity. At one extreme, text files have a simple format. Files which can contain scripts or macros (such as wordprocessing or spreadsheet files) are of intermediate complexity, whereas flies containing code can only be fully analysed by a code parser. Whilst such code analysis is, in the long run, possible according to the present invention, embodiments of the invention may conveniently operate to remove all macros and scripts from document files, and not to pass any files consisting solely of programs, code, macros or scripts.

It will immediately be apparent that there will be frequent occasions when users may wish to receive such files. Accordingly, in a preferred embodiment, the present invention may operates alongside a filter that is arranged to filter files by source, so as always to pass files (or files of a certain type) from certain sources, and to reject such files from others.

Thus, whereas an embodiment of the present invention can block users from receiving code in files from all sources, the parallel filter permits such files from known sources only. Users can therefore receive files from system administrators or certified websites, for example, which would be rejected by the invention. By identifying only those sources from whom a user wishes to receive code, the present invention can block unwanted code.

Because the present invention can operate by detecting conformity with file standards, and typical user behaviour, rather than by detecting viruses, frequent updates are unnecessary; such updates are required only at the point where major changes to a standard gain widespread acceptance, or where user behaviour has substantially changed, both of which are slow processes as compared to the frantic speed with which anti-virus updates must be distributed. Likewise, since the number of tests to be performed remains more or less stable over time, there is no increase over time in the latency for starting programs.

These and other aspects, embodiments and advantages of the invention will be discussed in the following description and claims. Embodiments of the invention will now be described, by way of example only, with reference to the accompany drawings in which:

FIG. 4 shows an example layout of the different parts forming an email;

First Embodiment

Figure 1A:
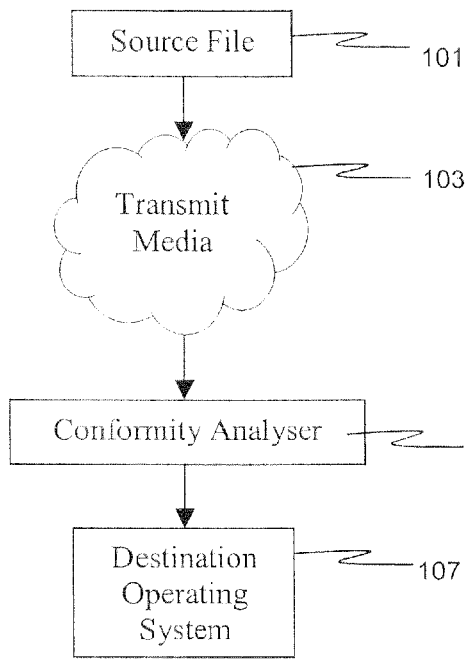
FIG. 1A shows a block diagram of an electronic file system according to an embodiment of the present invention.

A basic system layout showing a first embodiment of the present invention is indicated in FIG. 1A. An electronic file 101 is created at a source and is transmitted through a transmission medium 103. The transmission medium 103 may be any suitable medium for transmitting electronic files, including hardwired systems and wireless systems. The electronic file 101 passes through the transmission medium 103 in the normal manner until it reaches its destination. In this embodiment, an AV (anti-virus) application 105 is installed in a destination system. The AV application 105 operates such that the data within the incoming electronic file is not allowed to enter the destination operating system 107 until it has been analysed against a predefined allowable format, and, if the data is determined to be allowable, regenerated. Therefore, the AV application 105 determines whether the electronic file 101 is to be allowed to pass through to the operating system 107.

Figure 1B:
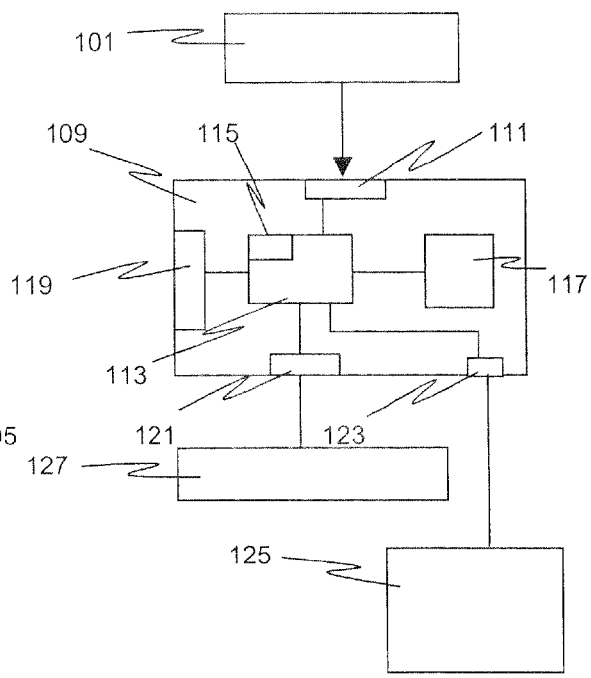
FIG. 1B shows a computer system adapted for use in embodiments of the present invention.

FIG. 1B shows a computer system adapted to implement embodiments of the present invention. The computer 109 receives the incoming electronic file 101 at an input interface 111. The input interface 111 is connected to a microprocessor 113, which is arranged to carry out various processes on the received file. The microprocessor 113 includes a parser 115. The microprocessor 113 is further connected to a memory device 117, a disk drive 119 and a number of interfaces (121, 123) to enable connections to be made to output devices such as a display 125 and a keyboard 127.

So that incoming executable files are not allowed to automatically run as they enter the AV application, the system arranges for the data making up the incoming electronic files to be stored in memory in any suitable scrambled format.

In this embodiment, the scrambling method reverses the order of the bits in a byte. That is, bits 0 to 7 are received in order, but are stored in a bit reversed manner such that bit 0 is switched with bit 7, bit 1 is switched with bit 6, bit 2 is switched with bit 5 and bit 3 is switched with bit 4. Therefore, as an example, a byte comprising 1 0 1 1 0 0 0 0 would be stored in the following order: 0 0 0 0 1 1 0 1. In this manner, any executable code is not able to automatically run and so any infected electronic files are not able to infect the AV application or the destination operating system.

As an alternative to the AV application being located at the file's intended destination, the AV application may also be located at the source, somewhere in the transmission medium, or elsewhere as long as it is capable of analysing the electronic file at a point along its transmission path.

Figure 1C:
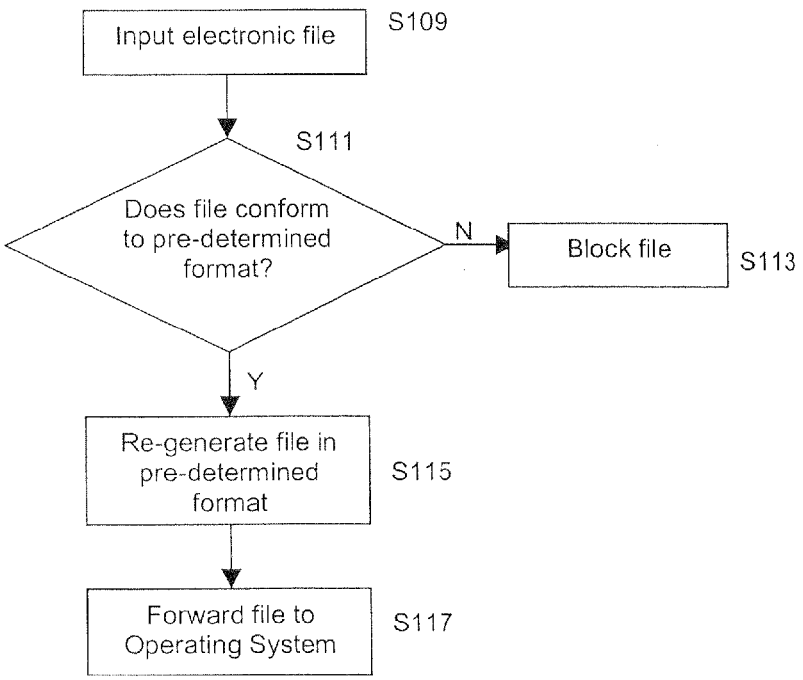
FIG. 1C shows a flow diagram of a process according to an embodiment of the present invention.

FIG. 1C shows a flow chart of the basic steps carried out by the AV application 105 in this first embodiment in order to determine whether the electronic file 101 is allowed to pass through to the destination operating system 107. At step S109, the electronic file 101 is input into the AV application 105 using any suitable means. The input means may vary depending on the type of electronic file being received and the medium over which it is being transmitted. In this embodiment, the electronic file 101 is accepted into the AV application.

At step S111, analysis is carried out by a conformity analysing device to determine if the electronic file 101 conforms to a predetermined format. The AV application is designed only to allow through electronic files that conform to one of a plurality of stored known, allowable, pre-defined formats. Generally, a file consists of content data encoded and arranged in accordance with a file type specification comprising a particular set of rules, each type of file (text, HTML, XML, spreadsheet and so on) having an associated set of rules. Common file types are sometimes indicated by the suffix of the file name (e.g. .pdf, .txt, .doc), and also or alternatively by the first few bytes of data in the file. Many file types include a header indicating something about the structure of the file, followed by the content data (e.g. text, numbers, audio or image data).

The content data may include parameters (for example, tags to indicate that the content data is to be presented in bold). The rules making up the file type specification may specify the values or range of that such parameters can take on. They may also specify, for example, the allowable values or range of values that the content data can take on.

An application program capable of opening a file of a particular type includes a parser for applying the rules making tip the file type specification to a file, to extract the content data for presentation or processing. For example, a word processing application may be capable of opening files in its proprietary file format (e.g. Microsoft Word™), the proprietary file formats of other word processing applications, and generic file formats such as Rich Text Format (RTF), ASCII and HTML. An application program capable of storing content data as a file of a particular type includes a generator for applying to content data the rules making up the file type specification to generate a file in the required format.

In the present embodiment, for each file type, a predetermined format is stored. The predetermined format generally includes the rules making up the file specification. However, the predetermined formats only include the rules relating to frequently used parts of the format. Additionally, the predetermined formats include additional rules constraining the values and/or ranges that content and parameters can take on, so as only to include commonly and frequently used values and ranges. Thus, only those parts of a file of a given type which consist exclusively of frequently or commonly occurring data and parameters can be analysed according to the corresponding stored predetermined format of this embodiment.

Examples of components of data types that are not allowed to pass through the system (because the predetermined formats do not include the rules relating thereto since they are infrequently used) are complex macros in word-processed files, and I-frames in HTML pages. Examples of infrequently used data values that are not allowed to pass through the system (because the predetermined formats are limited to values that exclude them) are control characters in an ASCII file other than the commonly-used TAB, CR/LF and LF characters.

The conformity analysing device determines if the electronic file is in the format it says it is, and that all parameters conform to the pre-determined format associated with that particular electronic file type. If the electronic file does not conform to any pre-determined format it is not regenerated, and so is effectively blocked, and preferably erased at step S113. However, if the electronic file does conform to the pre-determined format, the content data is extracted from it (and temporarily stored in a data structure), and is re-generated (from the temporary data structure) by the conformity analysing device in the pre-determined format associated with that electronic file type, to make up a substitute file, as shown at step S115.

The re-generated electronic file is then forwarded, for example, to the operating system at step S117 in order for it to be processed in a normal manner. All content data that can be extracted from the file using the rules making up the pre-determined format is extracted and regenerated, and any parts that cannot be extracted cannot therefore be regenerated.

In this manner, due to the conformity check and re-generation of the file, viruses are unable to enter and infect the operating system; in fact, nothing but content data in a commonly occurring format is extracted and consequently regenerated.

In situations where an electronic message can be broken down into sub-parts, some sub-parts of the electronic message may conform to a pre-determined format, whereas other sub-parts may not conform. In situations like this, the AV application determines if the total number of sub-parts that do conform meets a substantiality test (e.g. if the majority, or the most important parts, conform), and if so, regenerates the sub parts of the electronic message that do conform.

The non-conforming subparts of the message are not re-generated. Instead, the AV application inserts relevant warning text in the electronic message informing the recipient that part of the message was not allowed through. As an option, this warning text may indicate the reasons for not allowing the sub-part through.

Further, a part within a sub-part of the electronic file may also be blocked, i.e. not regenerated and preferably erased, if it does not conform to the allowable pre-determined format for that part. That is, for example, if a string of characters in an ASCII electronic file includes a control character (e.g. the 'BEL' character), this string of characters may be replaced with a text warning inserted by the AV application informing the intended recipient that the stung has been left out of this part of the re-generated electronic file because the part does not conform to the pre-determined format. The conformity analysing device does not specifically look for the control characters that are not allowed (e.g. the 'BEL' character), but instead passes only those control characters which are allowed, as defined by the pre-determined allowable format.

Alternatively, the non-conforming control character could be replaced by a space or completely removed. The different options chosen depend upon, for example, the environment in which the AV application is running and how important it is for at least the minimum of conforming information to be allowed to pass through the AV application to its destination.

A further alternative to the first embodiment will now be described. Upon the determination by the AV application that an electronic file, or sub-part thereof, does not conform and so is not permitted to pass through to the destination operating system, the original electronic file is passed to a threat filter application that determines whether there is any threat associated with the electronic file, or sub-part thereof.

The determination is made based on what the system expects to receive from certain sources. The system makes this determination by reviewing a list of data types against a predetermined list of sources stored in memory, to see if the data type is accepted from that source; in other words, emails are filtered by source. Therefore, if files that contain data that is non-conformant are received from the same source, where the non-conformant data is known not to be a threat, the original non-conforming data is allowed through to the operating system. In this manner, the system comprising the AV application and the threat filter application dynamically allows the majority of safe electronic files through to their intended destination.

Second Embodiment

In the following described second embodiment, the electronic files are e-mails transmitted over the Internet, from an originator to an Internet service Provider (ISP). The ISP forwards the e-mails to an e-mail client server, whereupon receipt, the e-mail client server forwards the e-mail to the intended recipient's Inbox.

Figure 2:
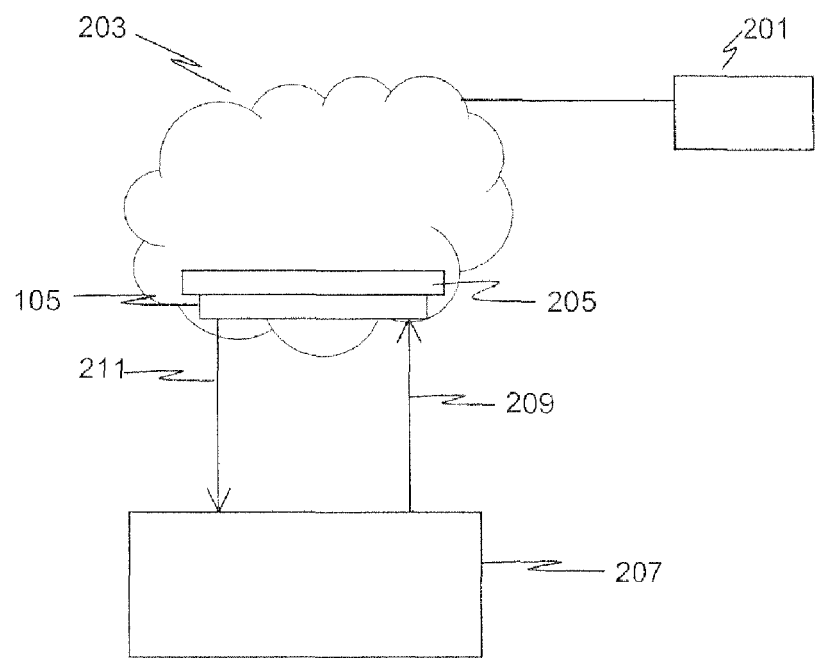
FIG. 2 shows a block diagram of an e-mail system according to a second embodiment of the present invention.

FIG. 2 shows a layout of an e-mail system according to this embodiment in which the AV application of the present invention is incorporated. An e-mail is forwarded by a sender from a source location 201. The e-mail is forwarded via the Internet 203 to an Internet Service Provider (ISP) 205, determined by the domain name incorporated within the e-mail. A recipient's e-mail client server 207 is connected to the ISP 205 through direct open connections. The first connection is a Simple Mail Transfer Protocol (SMTP) outgoing connection 209 for forwarding outgoing e-mail from the e-mail client server 207 to the ISP 205. A second connection is a POP (Post Office Protocol) incoming connection 211, which retrieves e-mail from the ISP 205.

The AV application 105 is situated at the ISP 205. The AV application 105 resides on the input/output ports connected to the recipient's e-mail client server 207, in order to analyse all outgoing and incoming e-mails being sent and received by the e-mail client server 207.

In this embodiment, the AV application 105 is a piece of computer code, which is implemented u programming techniques. All e-mails that are sent to the e-mail client server 207 must pass through the AV application 105 before the e-mails are able to enter the e-mail client server 207. Likewise, all e-mails forwarded by the e-mail client server to the ISP 205 must pass through the AV application 105 prior to entering the ISP 205.

The AV application 105 analyses the incoming e-mail message by parsing the data as it enters the application. As in the first embodiment, the data is stored in a scrambled mode in order to stop any executable files from running. The AV application 105 determines if the separate parts of the incoming e-mail conform to a predetermined allowable format, and, if the part does conform, it regenerates each part of the e-mail message. Therefore, any virus within any e-mail is not allowed through to infect the recipient's system, nor pass from the recipient's system to the ISP.

A conformity analysing device is used in this embodiment to analyse specific data types to see if it conforms to a pre-defined format for that data type (as discussed in the first embodiment) and extract that content data which does conform. The conformity analysing device then regenerates the data using the pre-defined allowable format for that data type. Each type of data is analysed and re-generated by its own specific conformity analysing device.

Each conformity analysing device runs a specific set of rules on the data depending on the type of data received. The rules are defined by the official pre-defined specification for the file type, and real world commonly occurring (and hence safe) examples of known data types. Generally the rules allow only a subset of files which conform to the file type specification, but they may relax certain rules of the official specification where these are commonly breached. For example, email addresses should contain no spaces, but some popular email applications breach this rule, so that emails which violate the specification in this regards are common, and thus the predetermined format for analysing emails according to this embodiment accepts e-mail addresses which contain a space, and thus the embodiment analyses and extracts such email addresses.

Also, the conformity analysing device may check a certain parameter within a data file. For example, if the header states that the file is an RTF (Rich Text Format) file, then the first few bytes of data are read to determine if this is correct.

Figure 3:
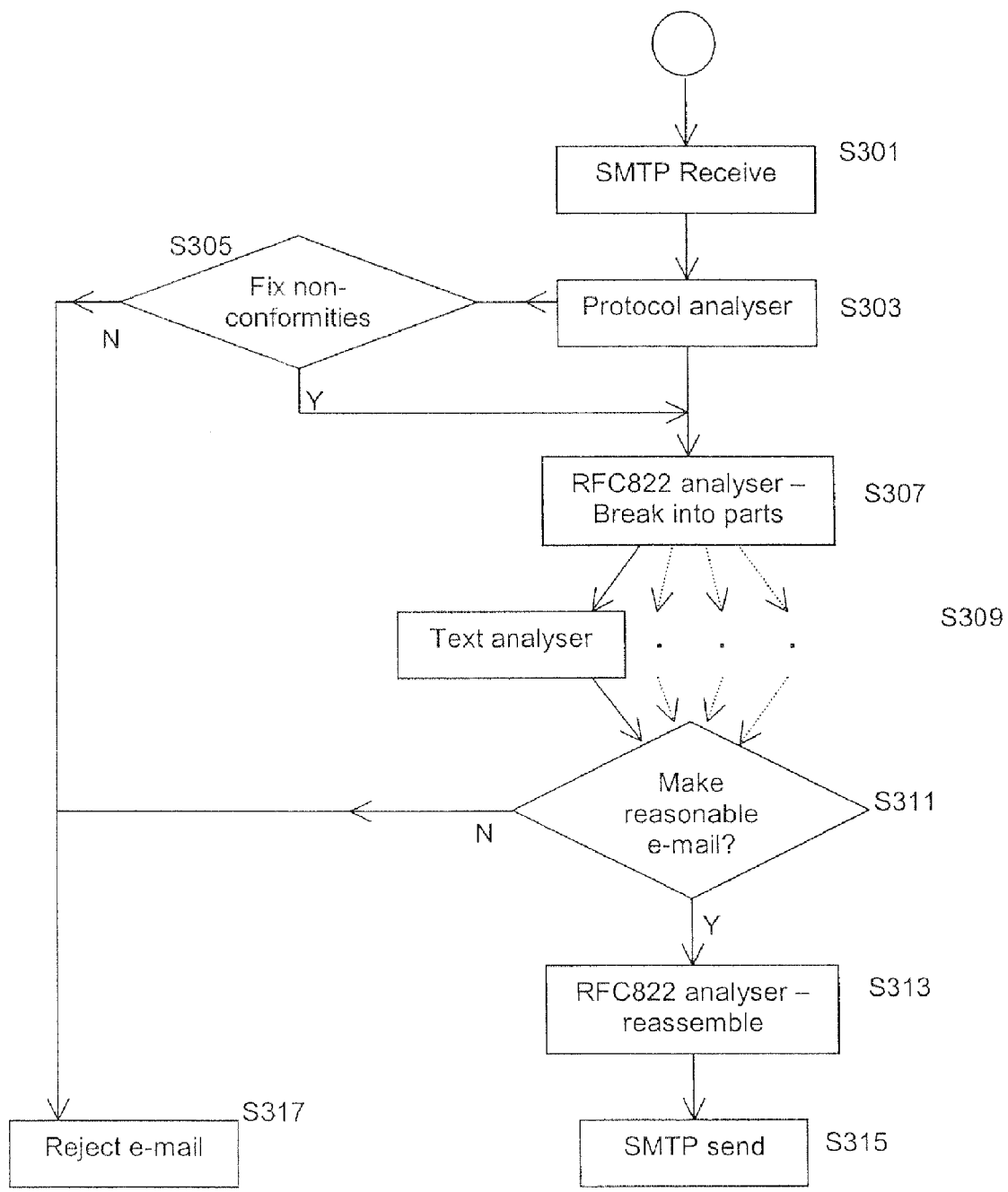
FIG. 3 shows a flow diagram of a process according to a second embodiment of the present invention.

FIG. 3 shows a flow diagram of how a system works that incorporates an AV application according to this embodiment. As can be seen in FIG. 3, at step S301, the e-mail is received at the ISP over the SMTP incoming connection.

At step S303, a protocol conformity analysing device carries out a process to read the incoming e-mail's basic format, and regenerate the e-mail so that it conforms to the basic e-mail protocols. An e-mail reader that is non-conformant reads the e-mail. The read data is then passed to an e-mail writer that does conform to basic e-mail protocols. In this manner, common non-conformities are converted in to a conforming e-mail. For example, if a recipient's e-mail address is badly formed, the e-mail writer re-writes it so that it does conform.

A further example is when an e-mail message is received without a 'From:' header. In this case, the e-mail message is encapsulated in a whole new e-mail message including a 'From:' header.

Other parameters within the e-mail are also made to conform. For example, line length, correct ASCII character codes being used, correct Base 64 coding being used where appropriate, intact header information ('To:', 'Subject:' etc.), a space between the header and the body of the e-mail, and so on.

If the e-mail is so badly formed that part of it cannot be rewritten, then it is determined whether a reasonable e-mail still exists if the non-conforming part were missing. If it is determined that the process will still result in a reasonable e-mail, the e-mail is rewritten with the non-conforming part missing. A warning text may be inserted in its place.

Also, the protocol conformity analysing device may reject the whole e-mail. For example, if the protocol conformity analysing device detects that non-conforming base 64 encoding is being used on a large piece of data within the e-mail, the e-mail is completely rejected at step S305.

If the protocol conformity analysing device determines that the e-mail does conform to e-mail protocols, it is regenerated by the protocol conformity analysing device and passed on to the next step in the process.

All e-mails should conform to the current RFC standard for e-mail (i.e. RFC 822 and its successors). This standard defines how the e-mail is formed. After the e-mail passes through the protocol conformity analysing device, the RFC 822 conformity analysing device checks to see if the e-mail conforms to the RFC 822 standard. The RFC 822 conformity analysing device carries out this conformity check by first breaking the e-mail up into its separate component parts by finding the boundaries within the e-mail (as discussed below), and then parsing each component part of the e-mail to see if it conforms to RFC 822.

It will be understood that updates would be required when the RFC standard is updated to ensure that the RFC 822 conformity analysing device is able to check the conformity of all known data types.

As is well known, an e-mail is made up of a number of separate parts, as shown, for example, in FIG. 4. The e-mail starts with an RFC 822 header 401, which defines a number of fields, such as 'From:', 'To:' and 'Subject:' etc. Next is the MIME header 403, which defines a number of fields for use in the extension protocol, such as 'Content-Type:' that defines the text used to indicate the boundary between the different parts of the e-mail.

After the headers (401 & 403), the first boundary 405 is indicated. The next part of the e-mail starts with a further MIME header 407, which defines the format used in this part. In this example this part comprises text matter to be displayed in a text format. The block of text 409 therefore follows. At the end of the text block 409 is a further boundary 411.

A further MIME header 413 indicates what format the next part of the e-mail will be in. In this example, the next part of the e-mail is a mixed text and HTML formatted block 415. A further boundary 417 indicates the end of that part to the e-mail.

For the last part of the e-mail, the final MIME header 419 indicates the data type for an attachment to the e-mail, which in this case is a zip file. The ZIP file 421 is base 64 encoded and added to the e-mail. A final boundary 423 then indicates the end of the e-mail.

At step S307 in FIG. 3, the RFC 822 conformity analysing device parses the ASCII characters forming the e-mail using a parser. The RFC 822 conformity analysing device is then able to detect the boundaries in the e-mail and check to see if certain parameters conform to a known acceptable pre-determined format. For example, the RFC 822 conformity analysing device checks the line length to see if it conforms to the RFC 822 standard and so only line lengths of 2000 or less are regenerated.

Further checks can be made to see if the parsed data within the e-mail conforms to the RFC 822 standard. For example, it is checked whether the characters within the e-mail are known acceptable ASCII characters as defined in the standard, whether the information in the header is as defined in the standard and whether the header length conforms to the standard definition. These checks listed are merely examples of a large group of different checks the RFC 822 conformity analysing device carries out (the rest of which will be apparent to one skilled in the art), and as such, this invention is not limited to those listed above.

As well as analysing the parsed data to see if it conforms to the basic RFC 822 standard, the RFC 822 conformity analysing device also checks to see if certain parameters conform to real world examples of RFC 822 standard e-mails. That is, the specification of certain parameters may be left open for users to define, whereas, in the real world, only reasonable values would be used. For example, an e-mail would usually only comprise a minimal number of parts. So, if an e-mail is received that includes 1000 boundaries, this would not be a real world example of RFC 822 standard e-mails, and so would be blocked, i.e. not regenerated and preferably erased, by the RFC 822 conformity analysing device.

For each component part of the e-mail comprising data that needs further conformity checking, the component part is forwarded at step S309, in this embodiment, in parallel to a separate conformity analysing device depending on the type of data the part corresponds to. That is, if the e-mail part being analysed is defined as text, the ASCII characters making up the text are forwarded to a text conformity analysing device. If the e-mail part being analysed is defined as a TIFF file, the characters making up the TIFF file are forwarded to a TIFF conformity analysing device.

At step S309, each of the conformity analysing devices analyses the data forwarded to it to see if it conforms to its purported format. If the data does conform it is regenerated by the conformity analysing device. If any non-conformity is within the data, the data is either left out, or, if possible, regenerated by the conformity analysing device so it does conform. One example of regenerating the data so it does conform is that of adding nested brackets in an RTF file wherever they are missing.

If an e-mail comprises a nesting of different types of data, conformity analysing devices are recursively called, so that several specific devices are run in sequence and each being put on hold at each point that a further type of data is discovered. In this manner, an e-mail with a zip file, that includes a word processing document, which includes a JPEG picture file could run through the sequence of different conformity analysing devices (zip, word processing, JPEG) in order to drop down through the nesting of files and analyse each file in sequence. At the end of the analysis, the file is reassembled using the conforming regenerated parts.

Upon a determination at step S311 that enough parts of the e-mail have been regenerated to form a suitably coherent, understandable and worthwhile e-mail, the data is reassembled using the RFC 822 conformity analysing device using the regenerated parts, as shown at step S313. This ensures that the regenerated e-mail is forwarded in the correct format.

The AV application then forwards the re-generated e-mail to the intended recipient using the SMTP protocol, as indicated in step S315.

However, if the AV application determines at step S311 that enough parts of the e-mail have not been regenerated to form a useful e-mail, the e-mail is rejected at step S317. During step S317, warning text is forwarded to the intended recipient of the e-mail informing them that an e-mail intended for them was rejected by the system. The warning text may include details of why the message was deleted and further information intended to help the recipient identify either the sender, or the reason why the e-mail was rejected.

Described in detail below are some example conformity analysing devices for use in this embodiment, which could be used during step S309. As shown at step S309, the component part of an e-mail that purports to be text, based upon the information in either the RFC 822 header, MIME header or the file extension, is passed to a text conformity analysing device. The text conformity analysing device parses the text data to determine if it conforms to its pre-determined allowable format as described below.

As there are a number of different types of text file, such as, for example, Comma Separated Variable (CSV) and Rich Text Format (RTF), the text conformity analysing device must first differentiate what type of text file the parsed data is purporting to be. All files attached to e-mail will have a file extension associated with it that indicates what the file type should be. The text conformity analysing device analyses the parsed file extension within the MIME header to determine if the text file is a pure ASCII file. If so, it is only necessary to use an ASCII conformity analysing device, as described below.

However, if the text conformity analysing device, upon analysis, determines that the text file is a file type other than pure ASCII, for example a CSV file, then a CSV conformity analysing device will also be called up to analyse and regenerate the CSV data. Firstly however the ASCII conformity analysing device analyses the ASCII characters making up the text file within the e-mail to see if the text string conforms to the ASCII pre-determined format, and, if there is conformity, regenerates the ASCII file.

The ASCII conformity analysing device parses the data to ensure the file conforms to the minimum ASCII pre-defined format. For example, the ASCII conformity analysing device only allows the ASCII characters 32 to 127, and four control characters, 'line feed' (LF=10), 'carriage return' (CR=13), 'tab' (TAB=9) and 'vertical TAB' (VT=11) to be regenerated and passed through the system.

Other control characters, such as the bell character (BEL=7), are not in the pre-determined allowable format for an ASCII file, as defined by the AV application. So, the ASCII conformity analysing device does not regenerate the 'BEL' character in the block of ASCII codes being parsed, but will reject that ASCII character.

Other examples of analysis the ASCII conformity analysing device carries out are:

Is the natural line length less than 1024 characters?
Are word lengths less than 25 characters?
Is the percentage of spaces to characters under a pre-defined limit?

If at any time the ASCII conformity analysing device is not able to regenerate the data for that part of the ASCII code because it does not conform to the basic pre-determined format, the ASCII conformity analysing device checks the data to see if it conforms to some other type of ASCII code. For example, source code, BinHex, Base 64. If the data does conform to another type of ASCII code, the data is forwarded to the relevant conformity analysing device for that ASCII type, which would be, for the examples shown above, a source code conformity analysing device, a BinHex conformity analysing device or a Base 64 conformity analysing device. It will be understood that a Base 64 ASCII code file may also include other types of files within the encoded data. These other types of files would then also be forwarded to the relevant file type conformity analysing device, and so on.

The conformity analysing devices for the further types of ASCII code would have further conformity limitations for the data within this part of the e-mail. For example, the file could be checked to see if it is properly structured code, has correct line lengths, and so on. Once each conformity analysing device has determined that the content and parameter data conforms, and accordingly extracted it, the extracted content data is regenerated in the allowable pre-defined format using the conformity analysing device.

Once the ASCII conformity analysing device has finished its task, the regenerated ASCII data is forwarded to the relevant text conformity analysing device that the data purports to be. In this embodiment, the text file is a CSV file, and so the data is forwarded to the CSV conformity analysing device.

Examples of checks carried out by the CSV conformity analysing device are as follows. The CSV conformity analysing device parses the ASCII data to ensure there are no long text paragraphs, as paragraphs are not part of the pre-defined format for CSV files. Any data that cannot be parsed because it does not conform is rejected by the CSV conformity analysing device. The CSV conformity analysing device also checks, for example, to see if the number of de-limiters conforms to the normal pre-determined number of de-limiters in a CSV file. When the CSV conformity analysing device determines that the data does conform, the data is regenerated into the same format.

In this manner, only parts of a text file that do conform to a pre-determined format are allowed to pass to the next stage of the AV application. Only the conforming parts of the text file are regenerated with the other regenerated data type portions before being reassembled and forwarded to the destination. Therefore, any parts of the e-mail that contain a virus would not conform and so would be blocked, i.e. not regenerated and preferably erased. Any non-conforming parts are not allowed to pass through the AV application and infect the operating system.

A further example conformity analysing device is a TIFF (Tagged Image File Format) conformity analysing device, used to analyse and regenerate TIFF files.

A TIFF file has a structured format with a set of directories and tags arranged in a pre-defined format. It is not possible to determine whether the image data itself represents a meaningful image. However, the TIFF conformity analysing device parses and analyses the image data to ensure that it falls within pre-defined limits.

The header information in the TIFF file is parsed and analysed to see if the correct information is complete and intact. For example, the TIFF conformity analysing, device checks to see if the header information includes resolution, size and depth fields that are within reasonable limits for a TIFF image. Further, the TIFF conformity analysing device determines if the number of strips indicated in the header matches the image data.

TIFF files are typically compressed, usually using LZW (Lenpel-Ziv-Welch) compression techniques. Each TIFF strip is decompressed by the conformity analysing, device to see if the strip length is within reasonable pre-defined limits. For example, if the strip length is not equal to or less than a maximum image size limit (for example, greater than a standard A0 paper size), the strip is rejected. As soon as the TIFF conformity analysing device rejects one strip, the whole TIFF file is rejected.

The TIFF conformity analysing device also carries out analysis on the tags (i.e. parameter data) within the TIFF file. The tags are checked against a pre-defined allowable format to see if, for example, the tags are in the specified order (according to the directory of tag information in the header) and the tags are inter-related in the correct manner.

When the TIFF conformity analysing device determines that the data conforms to the pre-defined allowable format, the data is regenerated to create a regenerated TIFF file having the original file name (where the file name conforms to the predetermined format). The regenerated TIFF file is forwarded to the e-mail server to be re-assembled into an e-mail.

It is also possible to have other image types within the TIFF file itself. For example, JPEG images may be encapsulated within the TIFF file. If a different image type is detected by the TIFF conformity analysing device it forwards the data associated with that image to a further conformity analysing device, in this example, a JPEG conformity analysing device. The JPEG conformity analysing device then parses and analyses the data to see if it conforms to an expected JPEG format, and if so, regenerates the data in the JPEG format. The regenerated data is then re-assembled into the regenerated TIFF file, which is then used to re-assemble a regenerated e-mail. This e-mail is then passed on to the e-mail server.

A further option available in this embodiment is for the AV application to insert warning text in place of non-conforming parts of the e-mail. That is, if a conformity analysing device parses the data for the non-conforming part and determines that a portion of the part does not conform to the pre-determined allowable format, upon regeneration of the e-mail, the conformity analysing device inserts warning text in place of the non-conforming part informing the intended recipient of the e-mail that a portion of the e-mail was rejected by the AV application. Alternatively, if a conformity analysing device rejects a whole part of an e-mail due to non-conformity, the AV application inserts warning text within the e-mail informing the intended recipient that a part of the e-mail was blocked, i.e. not regenerated and preferably erased, by the AV application.

Third Embodiment

Figure 5:
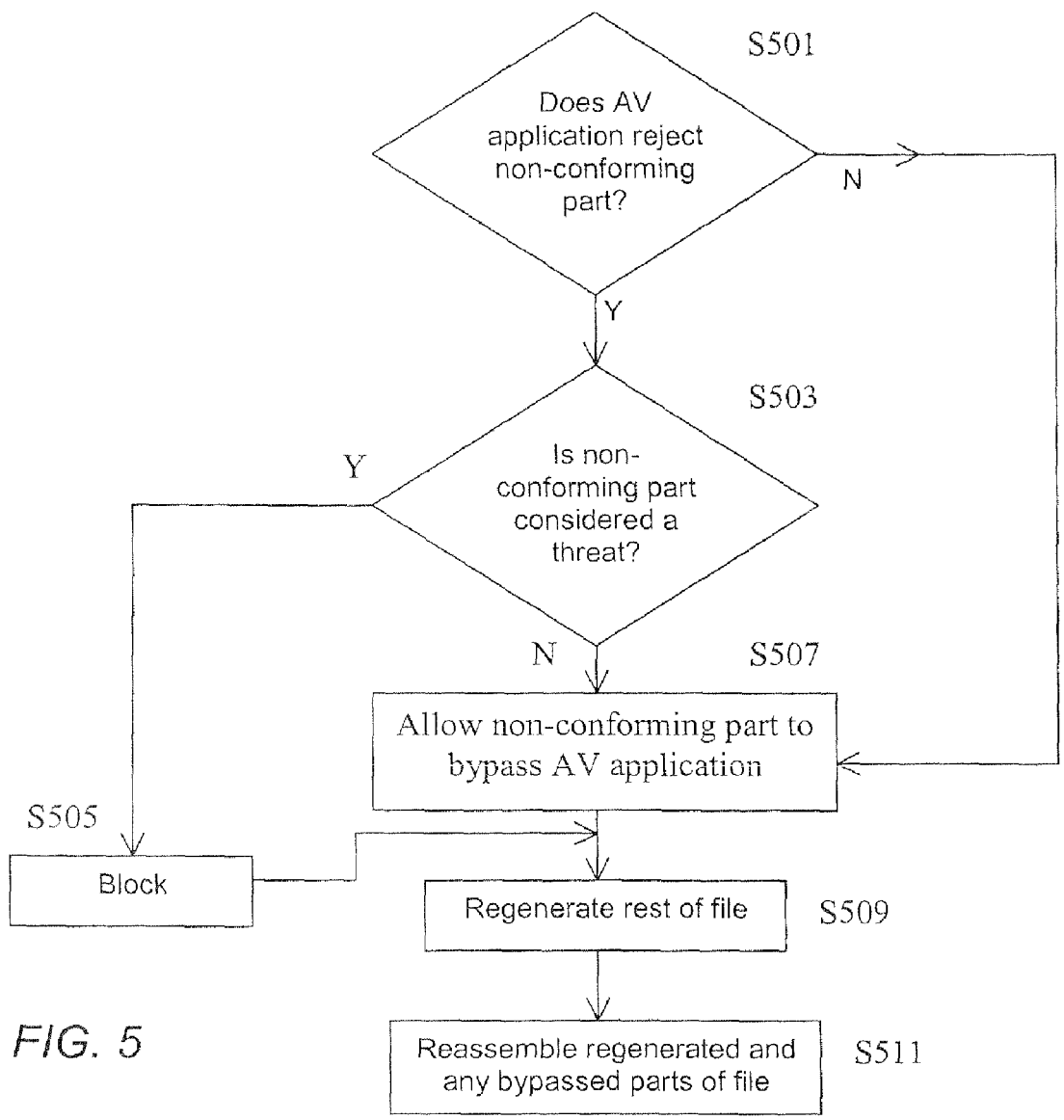
FIG. 5 shows a flow diagram of a process according to a third embodiment of the present invention.

Referring to FIG. 5, a third embodiment of the present invention will now be described.

This third embodiment incorporates all the features of the second embodiment, including any of the options discussed in relation to the second embodiment.

FIG. 5 shows a flow diagram of a process according to this third embodiment.

This embodiment relates to the situation whereupon the AV application has blocked a portion, part or the whole of an e-mail (referred to as 'non-conforming part' in this embodiment). At step S501, the AV application makes the determination as to whether the part is non-conforming and so is to be blocked. If blocked by the AV application, the non-conforming part is forwarded to a threat-filter application to ascertain whether the non-conforming part is a threat, as shown at step S503.

The threat-filter application determines if the non-conforming part is considered a real threat based upon the system's user preferences. The system has stored within its memory a list of file types and sources associated with these file types that are not considered a threat. Therefore, the system can determine, based on the sender of the file and the file type, whether the file is to be allowed through.

If the determination at step S503 determines that the file type is not one of those listed as being allowable from the associated source, it is blocked at step S505.

If the file type is considered to be allowable, the non-conforming part bypasses the AV application at step S507. The AV application regenerates the rest of the received file at step S509, and reassembles the regenerated conforming parts and the bypassed non-conforming parts of the file at step S511.

For example, if a banking system receives from a known sender a large number of e-mails including spreadsheets that incorporate complicated macros, these may be outside the pre-determined allowable format for a macro within a spreadsheet attachment, and so the macro conformity analysing device would block this part of the e-mail.

However, as the banking system is able to determine who is sending the e-mails, and the sender is entered as a trusted partner of the banking system within a database for these file types, the spreadsheet within the e-mail is not considered to be a threat. Therefore, the system user can set up the threat-filter application to allow these non-conforming macro parts to bypass the AV application and be re-assembled into the e-mail with the regenerated parts of the e-mail.

Alternatively, the threat-filter application can be operated in a mode whereby it determines if a regenerated file received from the AV application should be allowed to continue through to the destination system. If the AV application receives a file that includes non-conforming parts that in themselves are not sufficiently non-conforming for the AV application to reject the whole file outright, but result in a regenerated conforming file that is substantially different from the original file, the regenerated file is forwarded to the threat-filter application. For example, the original file size may be considerably larger than a regenerated conformant file size due to a large number of re-written single words within a macro not being regenerated by the AV application.

The threat-filter application makes a determination as to whether the file type is being sent from an approved source for that file type, and if so, will allow the file type to pass through the system.

Further Embodiments

It will be understood that embodiments of the present invention are described herein by way of example only, and that various changes and modifications may be made without departing from the scope of the invention.

It will be understood that the present invention may be implemented in any system wherein electronic files are moved from a source to a destination. The method of sending the electronic files for the purposes of this invention is not limited to any particular method. That is, for example, the electronic files may be transferred from one component to another component within the hardware of a computer system. Alternatively, for example, the electronic files may be transferred over an air interface from a base station to a mobile telephone device. Also, for example, the electronic files may be transmitted through a local area network (LAN), wide area network (WAN) or over the Internet.

Further, it will be understood that, as a further option for any embodiment previously described, an over riding facility may be provided for users to manually over ride any of the determinations made by either the AV application or the threat-filter application when the electronic file is received. That is, when a conformity analysing device within the AV application blocks a portion, part or whole e-mail, due to its non-conformity, the user is given an option to still allow the non-conformity to be regenerated and reassembled in the e-mail.

One example of carrying out this option is to supply the intended recipient with a text warning asking them whether the non-conformant analysed e-mail should be allowed to pass through the system as if it did conform to the pre-defined allowable format. A response to this warning provides the conformity analysing device with an instruction to regenerate, if possible, and re-assemble the e-mail. Or, alternatively, the original e-mail is allowed to bypass both the AV application and threat-filter application to pass through the system without regeneration.

Further, it will be understood that the AV application as described in the second embodiment may be located somewhere other than at the ISP e-mail server. For example, the AV application may be located on and installed in the recipient's e-mail client server. In this manner, any e-mails forwarded by the e-mail client server to a recipient's Inbox on a hard disk drive are the regenerated e-mails as previously described.

Further, it will be understood that the AV application may be hardwired in a semiconductor device, such as, but not limited to silicon, gallium-arsenide (GaAs), indium-phosphide (InP). That is, the AV application has a quantifiable task, which does not require the need for updates to the process of defining a pre-defined conforming format. The instructions required to carry out the task of the AV application, including parsing, analysing, regeneration and re-assembling may be realised in any suitable semiconductor device. Further, the instructions required to implement the AV application might be stored in a semi-permanent or permanent memory device. The memory device would then be operable to run the AV application in association with a connected processor. In these cases, it is then possible to provide the invention separate from the computer to be protected, as a separate device (for example in a card such as a modem card, network adapter card, or disc drive controller) including processor and memory hardware separate to those of the computer to be protected. That has the advantage of isolating the incoming electronic file completely from the file system and other resources of the computer to be protected, and storing it in a location which cannot normally be written to or updated, so as to avoid "trap-door" attacks on the AV application itself, in other words, a level of physical security. The semiconductor device may consist of a processor and a memory device wherein the processor runs the AV application from the memory device and stores incoming files in the memory device to isolate them.

Further, it will be understood that the semiconductor device described above may be provided as part of on any suitable network card using conventional methods. In this manner the network card may be utilised in a communications network as a means to ensure the network is protected from unwanted code and data by regenerating the received electronic files using the methods described.

Further, it will be understood that the electronic files as described in the first embodiment may be received by a computing device, wherein the electronic files are stored on a removable memory device. For example, the electronic files may be stored on a USB disk device, a smart card, a secure digital (SD) memory device, a multi media card (MMC) memory device, a compact flash (CF) card type 1 or 2, a smart media (SM) card, a XD card, a floppy disk, a ZIP drive, a portable hard drive or any other suitable memory device that may connected, directly or over a wireless medium, to a computing device.

Further, it will be understood that an operating system as described in this application can be any system that uses files. For example, an embedded system, router, network card or the like.

Further, it will be understood that other scrambling methods may be utilised to ensure any received executable files cannot be automatically executed. For example, the scrambling method stores each pair of incoming bytes using a byte swap method. In this example, if 6 bytes, A B C D E F, are being received by the AV application with byte A being received first and byte F being received last, they are stored in memory in the following order: B A D C F E. The first byte (A) is stored in a second memory location, and the second byte (B) is stored in a first memory location. This reversal occurs in subsequent memory locations for each pair of bytes received. In this manner, any executable code is not able to automatically run and so any infected electronic files are not able to infect the AV application or the destination operating system.

For the avoidance of doubt, protection is hereby sought for any and all of the novel embodiments described above, singly and in combinations.

Having described various aspects and embodiments of the invention and modifications thereof, persons skilled in the art will appreciate that the invention can be modified in arrangement and detail without departing from the principles thereof. We claim all embodiments, variations and modifications coming within the spirit and scope of the following claims.

The invention claimed is:

1. A method for resisting spread of unwanted code and data without scanning incoming electronic files for unwanted code and data, the method comprising the steps, performed by a computer system, of:
   (a) receiving an incoming electronic file containing content data in a predetermined file type corresponding to a set of rules;
   (b) determining a purported predetermined file type of the incoming electronic file;
   (c) parsing the content data in accordance with a predetermined data format comprising a set of rules corresponding to the determined purported predetermined file type; and
   (d) if the content data does conform to the predetermined data format, regenerating the conforming parsed content data to create a substitute regenerated electronic file in the purported file type, said substitute regenerated electronic file containing the regenerated content data
   wherein step (c) includes determining conforming data in the content data that conform to the predetermined data format and determining nonconforming data in the content data that does not conform to the predetermined data format, and
   the method further comprises:
   passing the nonconforming data to a threat filter,
   maintaining data indicating authorized data sources and for each data source, data types acceptable from the data source;
   determining, by the threat filter, that the nonconforming data is not a threat, if (i) a source of the content data is one of the authorized data sources and (ii) a data type of the nonconforming data is one of the data types acceptable from the source; and
   adding the nonconforming data to said substitute regenerated electronic file, if the threat filter determines that the nonconforming data is not a threat.

2. A method according to claim 1 in which the data format corresponds to a subset of the predetermined set of rules for each file type.

3. A method according to claim 1 comprising determining whether the content data conforms to prior known examples of acceptable data.

4. A method according to claim 3 in which the data format only includes allowable control characters.

5. A method according to claim 3 in which the data format contains a plurality of data items, each with an associated predetermined size limit.

6. A method according to claim 5 wherein the predetermined size limit is the size of a line in an image file.

7. A method according to claim 1 further comprising storing the incoming electronic file in a scrambled format in memory.

8. A method according to claim 7, wherein each byte of data is stored in a bit reversed order.

9. A method according to claim 7, wherein the data is stored such that each pair of data bytes received is placed in a reversed memory order.

10. A method according to claim 1, further comprising forwarding the substitute regenerated electronic file only if all of the content data from within the electronic file conforms to the predetermined data format.

11. A method according to claim 10 further comprising forwarding the incoming electronic file if a portion, part or whole of the content data does not conform only when the intended recipient of the electronic file has pre-approved the predetermined file type when associated with the sender of the electronic file.

12. A method according to claim 1, further comprising replacing any content data that does not conform to the predetermined format with warning text.

13. A method according to claim 1, wherein the incoming electronic file is an e-mail and the method further comprises forwarding the regenerated e-mail to the intended recipient if the content data conforms to the predetermined data format.

14. A method according to claim 13, wherein the substitute regenerated e-mail is forwarded from an e-mail client to a hard disk drive.

15. A method according to claim 13, wherein the substitute regenerated e-mail is forwarded from an Internet server provider server to an e-mail client server.

16. A method according to claim 1, further comprising receiving the incoming electronic file from a removable memory device, and forwarding the substitute regenerated electronic file to a computing device.

17. A non-transitory computer readable medium comprising a computer program adapted to perform the method of claim 1.

18. A semiconductor device comprising a memory means including instructions for performing the method of claim 1.

19. A semiconductor device according to claim 18, wherein the semiconductor device is a semi-permanent or permanent memory device.

20. A network card comprising the semiconductor device of claim 18.

21. The method according to claim 1, wherein
step (c) includes determining data in the content data that conform to the predetermined data format and deeming the conforming data to be free of viral and otherwise unwanted code and data and suitable for regeneration in step (d).

* * * * *